United States Patent [19]
Kessler et al.

[11] Patent Number: 5,815,708
[45] Date of Patent: Sep. 29, 1998

[54] METHOD AND APPARATUS FOR DYNAMICALLY LOADING METHOD CALL EXCEPTION CODE IN RESPONSE TO A SOFTWARE METHOD EXCEPTION GENERATED IN A CLIENT/SERVER COMPUTER SYSTEM

[75] Inventors: Peter B. Kessler; Graham Hamilton, both of Palo Alto; Jeffrey D. Nisewanger, San Jose, all of Calif.

[73] Assignee: Sun Microsystems, Inc., Mountain View, Calif.

[21] Appl. No.: 540,129

[22] Filed: Oct. 6, 1995

[51] Int. Cl.[6] .................................................... G06F 9/46
[52] U.S. Cl. ............................................................ 395/683
[58] Field of Search ........................ 395/200.05, 200.09, 395/683, 684, 685, 200.03, 200.33, 200.38, 200.31, 200.47

[56] References Cited

U.S. PATENT DOCUMENTS

| | | | |
|---|---|---|---|
| 5,307,490 | 4/1994 | Davidson et al. | 395/684 |
| 5,377,350 | 12/1994 | Skinner | 395/683 |
| 5,459,865 | 10/1995 | Heninger et al. | 395/683 |
| 5,511,197 | 4/1996 | Hill et al. | 395/683 |
| 5,566,302 | 10/1996 | Khalidi et al. | 395/200.09 |
| 5,568,643 | 10/1996 | Tanaka | 395/739 |
| 5,628,016 | 5/1997 | Kukol | 395/704 |

FOREIGN PATENT DOCUMENTS

| | | | |
|---|---|---|---|
| 0 471442A2 | 2/1992 | European Pat. Off. | G06F 9/44 |

OTHER PUBLICATIONS

"The Java Language Specification", Release 1.0 Alph3, May 11, 1995, Sun Microsystem Computer Corporation.
"Java and Internet Programming", Dr. Dobb's Journal, Aug. 1995, pp. 55–61 and 101–102.
"The Coming Software Shift Telecom", by George Gilder, Aug. 28, 1995, pp. 147–162.
"The Internet becomes multimedia–savvy: Macromedia, Sun nabe Netscape Navigator", by Jason Snell, MacUser, Sep. 1995, vol. 11, No. 9, p. 31(1).
"OSF Opens Software Web Mall For Java", Newsbytes, Jul. 26, 1995.
"Complex Browsers Seek to Expand Role", (World Wide Web browsers), by Scott R. Raynovich, LAN Times, Jul. 3, 1995, vol. 12, No. 13, p. 1(2).
"Sun, Netscape to wake up Web users", (Sun Microsystems license its Java World Wide Web development language to Netscape Communications Corp), Scott R. Raynovich, LAN Times, Jun. 19, 1995, vol. 12, No. 12, p. 44(1).
"Internet access: Sun unveils most complete set of Internet business solution available today; Internet pioneer delivers on challenge of electronic commerce", EDGE: Work–Group Computing Report, May 29, 1995, vol. 6, No. 262.
"Sun takes new shape"(Sun Microsystems strategy for its UltraSPARC microprocessor), by Jim DeTar, Electronic News (1991), May 29, 1995, vol. 41 No. 2067, p. 1(2).

(List continued on next page.)

*Primary Examiner*—Eddie P. Chan
*Assistant Examiner*—Gary J. Portka
*Attorney, Agent, or Firm*—William S. Galliani; Flehr Hohbach Test Albritton & Herbert LLP

[57] ABSTRACT

A method for handling method calls in a client/server computer system includes the step of receiving at a server computer a method call generated by a client computer. The server computer then attempts to execute the method call and subsequently generates an exception. The exception is passed to the client computer. The client computer matches the exception to exceptions in an exception list stored in the client computer to obtain an exception object identifier. The exception object identifier is used to load exception code into the client computer. The exception code is then processed. Thus, the exception code need not be loaded at the time of generating the method call. Instead, it is only loaded when it is required at run time.

12 Claims, 6 Drawing Sheets

OTHER PUBLICATIONS

"HotJava could become a lot hotter than just a Web browser for animations" (Sun Microsystems HotJava Web browser) (Distributed Thinking), by Stewart Alsop, InfoWorld, May 29, 1995, vol. 17, No. 22, p. 94(1).

"Sun Microsystems Bringing Interactive Technology to the WWW", by Michael Goulde, Open Information Systems, Mar. 1995, vol. 10, No. 3, p. 29(3).

"The Common Object Request Broker: Architecture and Specification", (COBRA V2.0) Revision 2.0, Jul. 1995.

"A Spring Collection", (A Collection of Papers on the Spring Distributed Object–Oriented Operating System), SunSoft, Sep. 1994.

"The Java Language Environment", by James Gosling and Henry McGilton, May 1995, pp. i–65.

Anonymous, "Handling Error Exceptions from Source Program", IBM Technical Disclosure Bulletin, vol. 35, No. 1A, Jun. 1992, New York, pp. 23–24.

"Dynamic and Transparent Loading of Dynamic Link Libraries in an OO Environment", IBM Technical Disclosure Bulletin, vol. 37, No. 2A, 1 Feb. 1994, pp. 257–260.

Ungar, D., et al., "Object, Message, and Performance: How They Coexits in Self", Computer, vol. 25, No. 10, 1 Oct. 1992, pp. 53–64.

European Search Report, Serial No. 96306580.0 dated Jan. 28, 1997.

"Handling Error Exceptions from Source Program", IBM Technical Disclosure Bulletin, vol. 35, No. 1A, Jun. 1992, New York, US, pp. 23–24, XP000308570.

"Dynamic and Transparent Loading of Dynamic Link Libraries in an 00 Environment", IBM Technical Disclosure Bulletin, vol. 37, No. 2A, Feb. 1994, pp. 257–260, XP000432639.

"Object, Message and Performance: How They Coexits in Self", Computer, vol. 25, No. 10, 1 Oct. 1992, pp. 53–64, XP000320414 (see p. 55, left col:12 to middle col.:9) and p. 57, left col.:21 to right col.:9.

METHOD AND APPARATUS FOR DYNAMICALLY LOADING METHOD CALL EXCEPTION CODE IN RESPONSE TO A SOFTWARE METHOD EXCEPTION GENERATED IN A CLIENT/SERVER COMPUTER SYSTEM

BACKGROUND OF THE INVENTION

1. Field of the Invention

This invention relates generally to client/server computer networks. More particularly, this invention relates to a technique for loading method call exception code into a client computer only when it is required at run time.

2. Description of the Related Art

In a client/server computer network, the user of a client computer requests the execution of an object. In particular, the user requests the execution of a method associated with the object. Frequently, the object is not stored locally on the client computer. Thus, a remote procedure call (RPC) must be made to a server computer on which the object resides. In most cases, the server computer executes the requested method to generate a result. The result is then passed to the client computer. However, when the server computer cannot execute the requested method or can only execute a portion of the requested method, an exception is said to exist. In this case, the server computer notifies the client computer of the exception. It is then incumbent upon the client computer to interpret the nature of the exception and take corrective action.

In many distributed computer systems that support remote procedure calls, for example computer systems using the SOLARIS™ operating system in conjunction with the JAVA™ virtual machine environment, both from Sun Microsystems®, Inc., Mountain View, Calif. (SOLARIS™, JAVA™ and Sun Microsystems® are trademarks or registered trademarks of Sun Microsystems, Inc. in the United States and other countries), when a client computer requests the execution of a method in an object (sometimes called invoking an object method), the client computer instantiates all the exception code associated with that method. The exception code might be stored locally on the client computer, but in many cases the exception code must be retrieved from a remote computer. Consequently, in most cases, by invoking an object, the client computer must retrieve exception code from a remote computer. Initiating communication with the remote computer and exchanging information with it is a relatively time consuming operation.

Since in most cases the invoked method is successfully executed, the method exception code is not used by the client computer. Thus, the client computer expends valuable time loading exception code that is not necessary. In view of this situation, it would be highly desirable to provide a technique for loading method call exception code only in the event that it is needed at run time.

SUMMARY OF THE INVENTION

An embodiment of the invention includes the step of receiving at a server computer a method call generated by a client computer. The server computer then attempts to execute the method call and subsequently generate an exception. The exception is passed to the client computer. The client computer matches the exception to exceptions in an exception list stored in the client computer to obtain an exception object identifier. The exception object identifier is used to load exception code into the client computer. The exception code is then processed in order to handle the exception. Thus, the exception code is not loaded at the time of generating the method call. Instead, it is only loaded when it is required at run time.

The apparatus of the invention includes a client computer that generates a method call. A server computer receives the method call from a transmission channel connected between the client computer and server computer. The server computer attempts to process the method call and thereafter generates an exception. The exception is passed over the transmission channel to the client computer. The client computer matches the exception to a set of stored exceptions. The matched exception is associated with an exception object identifier. The exception object identifier is used to load exception code. The client computer then processes the exception code, thereby responding to the exception generated by the method call.

The client computers of the invention operate much faster because they load less information when a method is invoked. Specifically, they only load the code for the method call. In the relatively unusual event that the method call is unsuccessful, then the method exception code associated with the method is expeditiously loaded.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
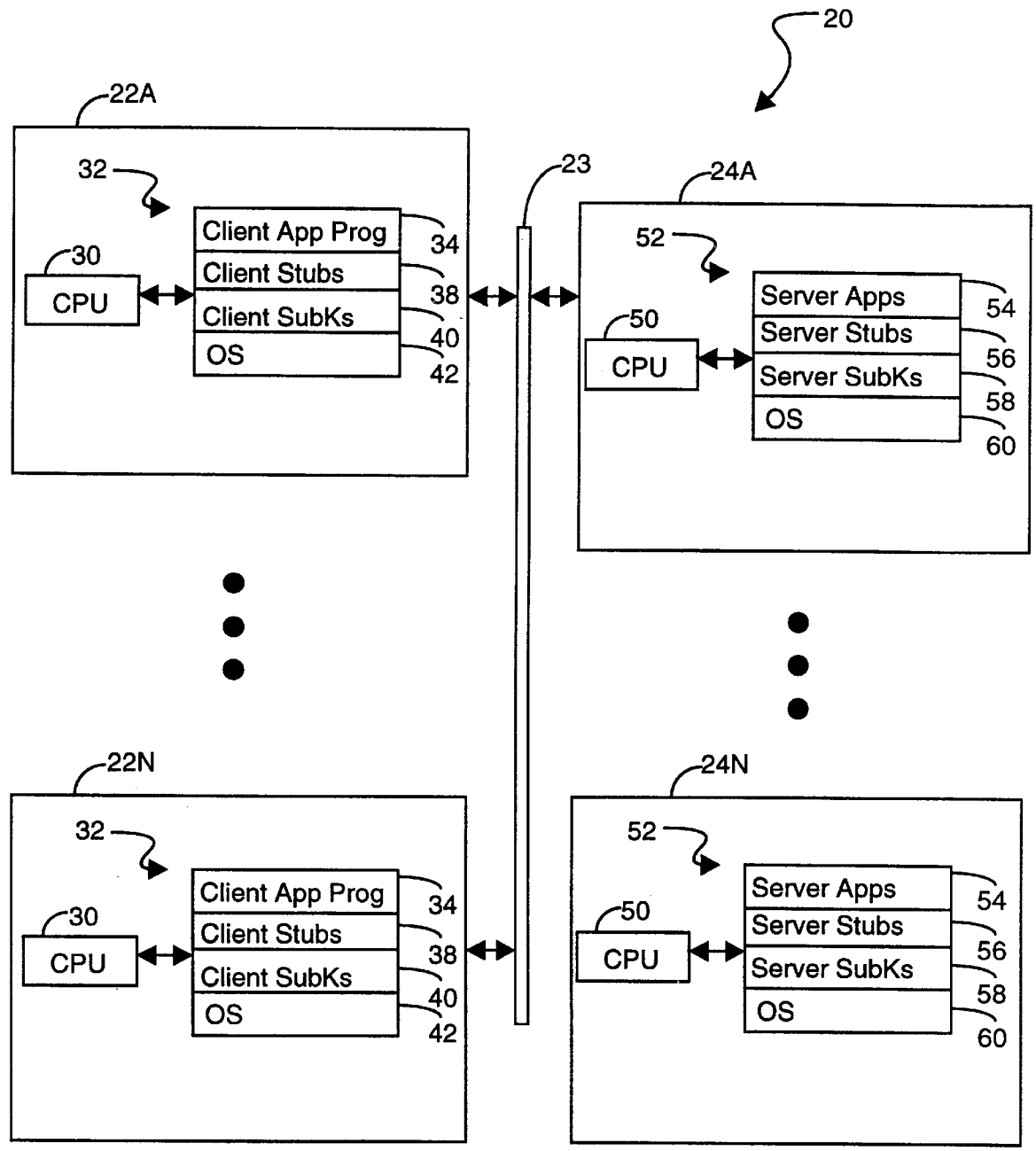
FIG. 1 illustrates a client/server computer topology.

FIG. 1 illustrates a client/server computer apparatus 20 incorporating the technology of the present invention. The apparatus 20 includes a set of client computers 22A–22N, which are each linked to a transmission channel 23. The transmission channel 23 generically refers to any wire or wireless link between computers. The client computers 22A–22N use the transmission channel 23 to communicate with a server computer 24A, or other server computers designated by server computer 24N.

Each client computer 22 has a standard computer configuration including a central processing unit (CPU) 30 connected to a memory 32, which stores a set of executable programs. The executable programs in this exemplary system include at least one client application program 34, client stubs 38, client subcontracts 40, and an operating system 42.

The client application program 34 is any application-level program, such as an application program that the user of a client computer 22 interacts with. The client stubs 38 receive procedure calls by the application program 34 requesting the execution of specified methods of specified objects. The purpose of the client stubs 38 is to access objects that are implemented in other address spaces, such as at server computer 24.

The client subcontract programs 40 and server subcontract programs 58 control the basic mechanisms of object invocation and argument passing. They control how object invocation is implemented, how object references are transmitted between address spaces, how object references are released, and similar object runtime operations. For example, when a client invokes an object of a given subcontract, the subcontract implements the object invocation by transmitting the request to the address space where the associated object is located, commonly the server computer 24.

The client subcontract programs 40 perform a marshal operation to transmit an object invocation (i.e., a remote procedure call) to another address space. A corresponding unmarshalling operation is performed by a server subcontract 58 on the server computer 24. The client subcontract programs 40 also perform unmarshal operations when receiving a reply (such as the results generated from a method call) from another computer, say the server computer 24. An operating system 42, such as the Sun Microsystem's SOLARIS operating system, underlies the operations of the client application programs 34, the client stubs 38, and the client subcontracts 40.

The server 24 has a configuration analogous to that of the client computers 22. The server 24 includes a CPU 50 and an associated memory 52. The memory 52 stores server application programs 54, server stubs 56, server subcontract programs 58, and an operating system 60. As indicated above, the server stubs 56 handle incoming method invocations on an object and call the specified method to perform the operation. As also indicated above, the server subcontracts 58 perform data marshalling and other operations to support the transport of method invocations and the resulting return messages between the server 24 and the client computers 22.

Figure 2:
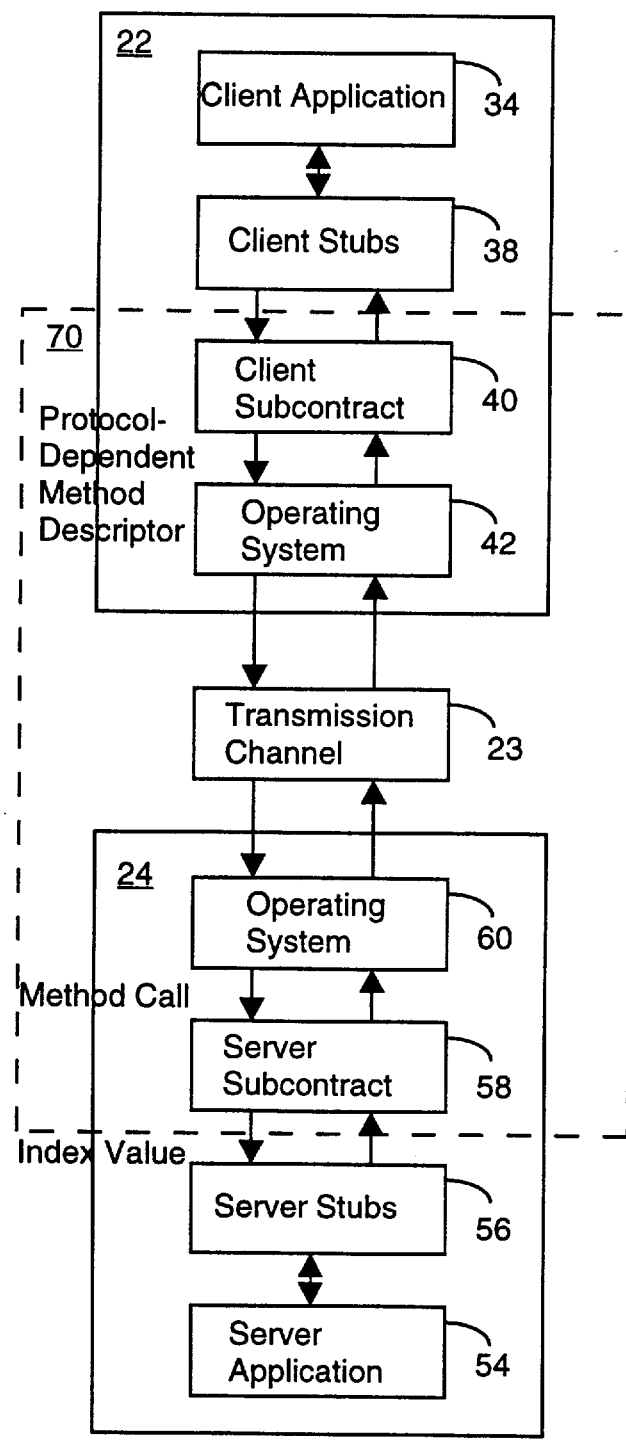
FIG. 2 illustrates the processing associated with the apparatus of FIG. 1.

The operations of the apparatus of FIG. 1 are more fully appreciated with reference to FIG. 2. FIG. 2 illustrates the client computer 22, the transmission channel 23, and the server 24 of FIG. 1. As indicated above, a client application 34 invokes a specified method of an object in a different address space using a remote procedure call. The remote procedure call is passed by the client stubs 38 to the client subcontract 40, which packages the remote procedure call for transport on the transmission channel 23. The server subcontract 58 of the server 24 receives the information and unpackages it. The server subcontract 58 then passes the information to the server stubs 56. The server stubs 56 access the server application programs 54, which are the previously described object methods. More specifically, a specified server stub 56 makes a procedure call to execute a specified method of the invoked object. The execution of the method produces a set of results, herein called a reply, which is then passed back to the server subcontract 58 and the communication path is reversed, as indicated by the arrows of FIG. 2.

Block 70 of FIG. 2 illustrates the components associated with an Object Request Broker (ORB) of the invention. As indicated above, a wide variety of communication protocols are used on ORBs. The use of different protocols on different ORBs results in difficulties when a server attempts to recognize incoming object requests.

The general architecture and processing associated with the invention has now been disclosed. Attention presently turns to a more detailed consideration of the architecture of the invention, the processing of the invention, the distinctions between these elements and corresponding elements in the prior art, and the advantages associated with the disclosed technology.

As shown in FIG. 2, a client subcontract 40 uses a protocol-dependent method descriptor to request a method associated with an invoked object. More particularly, the client subcontract 40 uses a marshal buffer that obeys a selected on-the-wire data format. For example, to identify a given method "X", one protocol might use a value of "XXX", another might use a value of "@@@:: 123::XXX", and another might use an integer value "123456", where the value is the output of a hash function on the method name. The client stub 38 passes to the client subcontract 40 a list of protocol-dependent values from which the client subcontract 40 computes the protocol-dependent method descriptor.

Thus, when a set of client computers 22A–22N are connected to a server 24, the server 24 must process each protocol. Separate server subcontracts 58 (not shown) are necessary to accommodate each of these protocols. In the prior art, each server subcontract 58 has a set of corresponding server stubs 56. Thus, to support ORBs with multiple protocols, a server 24 should have different server stubs 56 for each protocol, resulting in a large set of server stubs 56. Consequently, it can be readily appreciated that the use of different ORB protocols can result in unwieldy requirements for the server 24.

In accordance with the present invention, when the server subcontract 58 receives an incoming method call it unmarshals the method descriptor in a way that is specific to the subcontract's protocol. It then tries to match the method descriptor with each of the entries in a list of protocol-dependent values. Protocol-dependent values can be character strings, numeric values, as well as other types of parameter values. Different protocols may use different matching functions to compare the method descriptor with the list of protocol-dependent values. The matching function may by a string comparison, a hashing function, or other technique specified by the server subcontract 58. When a matching protocol-dependent value is identified, the server subcontract 58 can then associate it with an index value.

As shown in FIG. 2, the index value is passed to protocol-independent server stubs 56 that can invoke the method corresponding to the index value. In this way, the protocol dependencies of the individual object references are insulated from the protocol-independent server stubs 56. Consequently, protocol-independent server stubs 56 can be used with any type of object request broker 70. Furthermore, a single compiler may be used to generate the protocol-independent server stubs 56.

Thus, unlike the prior art, the present invention provides a server 24 that recognizes a variety of ORB protocols. Moreover, it performs this function in a highly effective manner by using a single set of protocol-independent server stubs 56.

Note that to support this technique, the marshalling and unmarshalling operations commonly employed by prior art stubs are performed by the client subcontract 40 and server subcontract 58 of the invention. This transfer of processing and the use of an index value to provide protocol-independent server stubs constitute differences between the prior art and one aspect of the present invention. Thus, this aspect of the present invention can be successfully implemented in existing architectures and processes, once these processing differences are accommodated.

Figure 3:
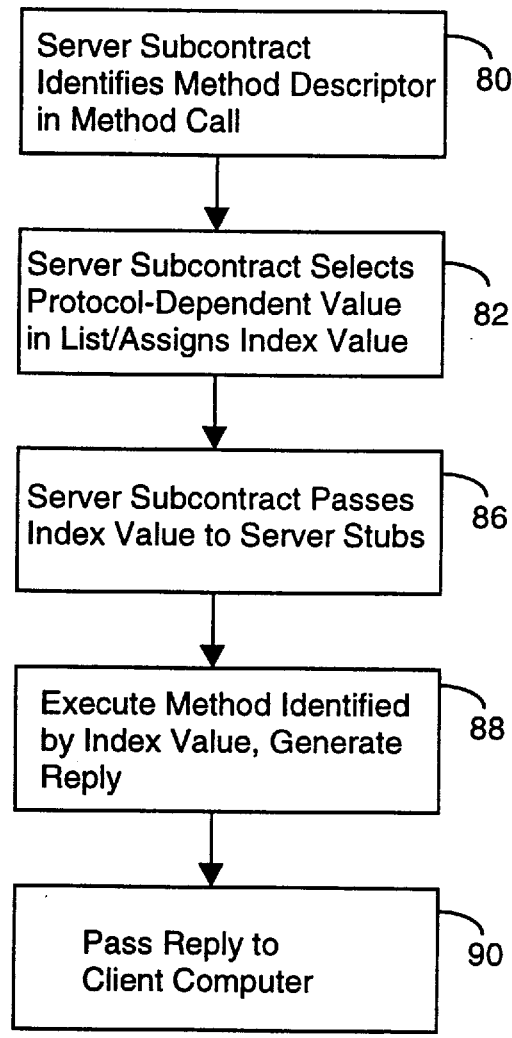
FIG. 3 illustrates the processing steps associated with the protocol recognition methodology of an embodiment of the invention.

FIG. 3 provides a detailed illustration of the processing steps described in the foregoing paragraphs. The first processing step of FIG. 3 is that the server subcontract identifies a method descriptor in a method call (block 80). As indicated above, the client computer produces a method call, which is ultimately packaged in a marshal buffer as a set of information. The content of the information is contingent upon the client subcontract that has marshalled the information. The corresponding subcontract at the server unmarshals the information and recognizes, within the information, the method descriptor.

Figure 4:
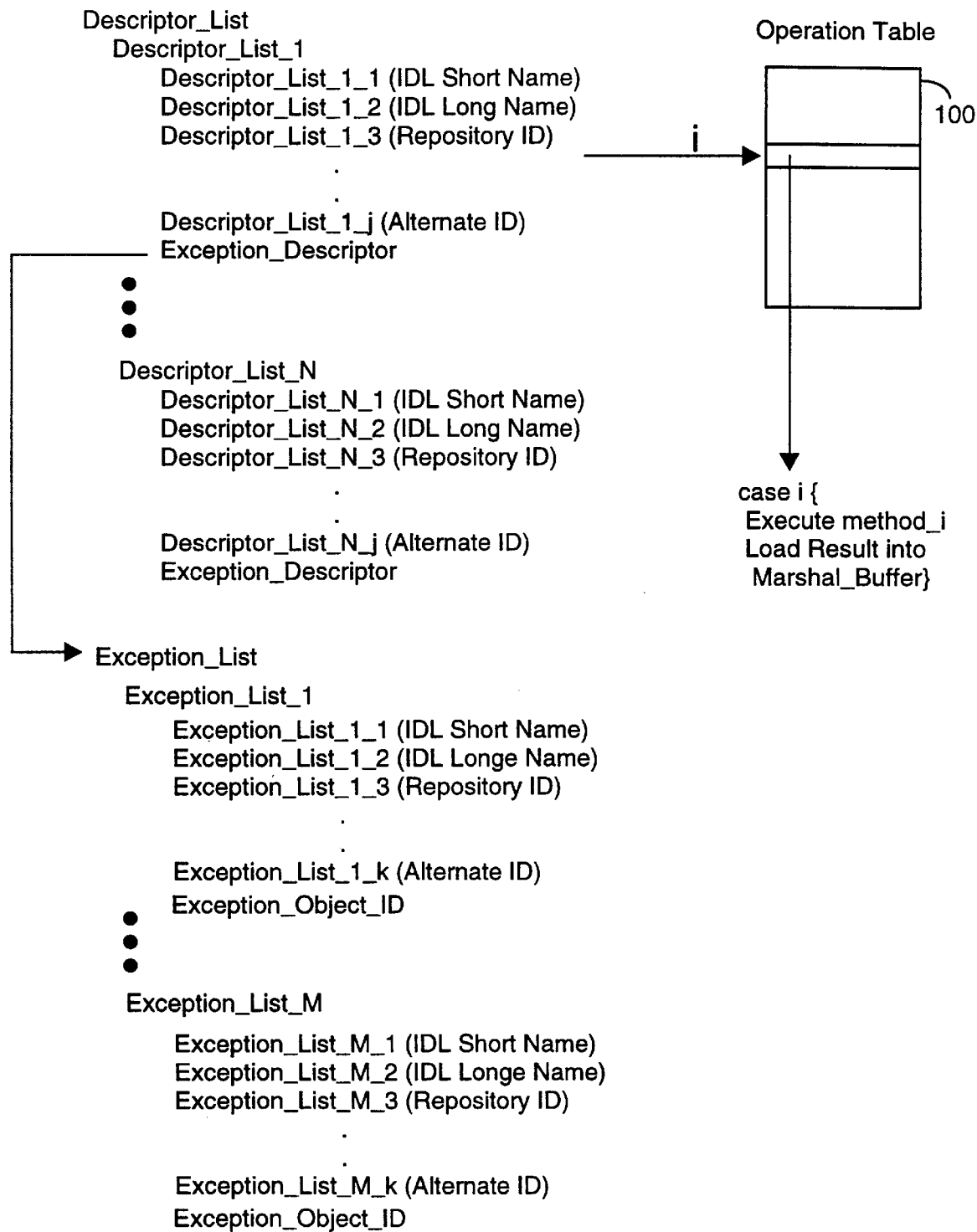
FIG. 4 illustrates an example of a data structure that may be used in practicing the disclosed technology.

The next processing step is for the server subcontract to select a protocol-dependent value that matches the method descriptor (block 82). This operation may be illustrated with reference to FIG. 4. FIG. 4 shows a Descriptor_List of protocol-dependent values. This list includes N subset lists. Each subset list identifies a set of protocol-dependent values that may be used to identify a single method. Each subset list has j entries. In FIG. 4, these entries are shown as Descriptor_List_1_1 through Descriptor_List_1_j. In FIG. 4, Descriptor_List_1_1 is associated with an Interface Definition Language (IDL) Short Name. IDL is a standard used in the art. That is, one entry in the list is the IDL short name for the invoked method. The IDL Short Name is an ORB protocol name used in the art. The same list shows that Descriptor_List_1_2 is associated with an IDL Long Name. That is, this entry in the list is the IDL long name for the invoked method. The IDL Long Name is another ORB protocol name used in the art. The third entry in the subset list is Descriptor_List_1_3, which has a repository ID. The repository ID is a name used in another ORB protocol in the art. Examples of these different protocols include the following statements:

"get_weak_comparator" (IDL Short Name),
"::comparator::weak_comparable::get_weak_comparator"
   (IDL Long Name), and
"IDL:/comparator/weak_comparable/get_weak_comparator:1.0"
   (Repository ID), which are used to invoke the operation:
   get_weak_comparator.

As indicated in FIG. 4, alternate designations may also be used in the list of protocol-dependent values. In addition, the designations shown by example herein need not be used. In any event, using the format established by the IDL standard and other industry standards and practices, it is possible to predict the manner in which most method descriptors will be implemented by any reasonable protocol.

The following pseudo code is used as a simple example to illustrate how the descriptor list may be searched.

```
(1)     i = 0
(2)     match = false
(3)     repeat
(4)         i = i + 1
(5)         if Match_p (Method_Descriptor, Descriptor_List_i_j)
(6)             Then Match = True
(7)     until Match
(8)     call operation_Table(i)
```

Lines (1) and (2) provide initialization. Line (3) is the entry into a processing loop. Line (4) provides initialization within the processing loop. Line (5) tests for a condition. Namely, the code tests if the unmarshalled "Method_Descriptor" of the method call matches the "jth" entry of the "ith" subset list (Descriptor_List_i_j) of the protocol-dependent list. The "jth" entry, say the IDL short name, is known from the server subcontract 58 to be the one to compare for this protocol. The "ith" value is an incremented value that allows each subset descriptor list (Descriptor_List_1 through Descriptor_List_N) to be tested. The term "Match_p" refers to the matching function that is used to compare the Method_Descriptor to the list entry. For instance, "Match_p" might specify a simple string comparison between values, or it might specify the comparison of hash values. The definition of "Match_p" is provided by the server subcontract 58.

If the condition is met, then a match is found, otherwise, the next subset list "i" is accessed. When a match is found, then line (8) provides a call to an operation table of the server stubs (56). Note that the value "i" when a match is found is the value passed to the server stubs. This value corresponds to a subset of the searched list, and this subset is associated with a single method that has been called. Thus, the code at line (8) illustrates the next processing step of FIG. 3, namely that the server subcontract passes an index value to the server stubs (block 86).

Once the server stubs receive the index value, they rely upon an operation table 100, shown in FIG. 4, to invoke the method specified by the index value. The operation table is preferably implemented as a case table that has a set of processing steps associated with each case value "i". When the value "i" is received, the method specified by the value is executed (block 88). FIG. 4 illustrates a simple set of processing steps to achieve this result. The first step is to execute method i, and the second step is to load all resulting messages (the reply) into the marshal buffer. The final processing step shown in FIG. 3 is for the server stubs to pass the reply generated from the execution of the method to the server subcontracts (block 90).

Figure 5:
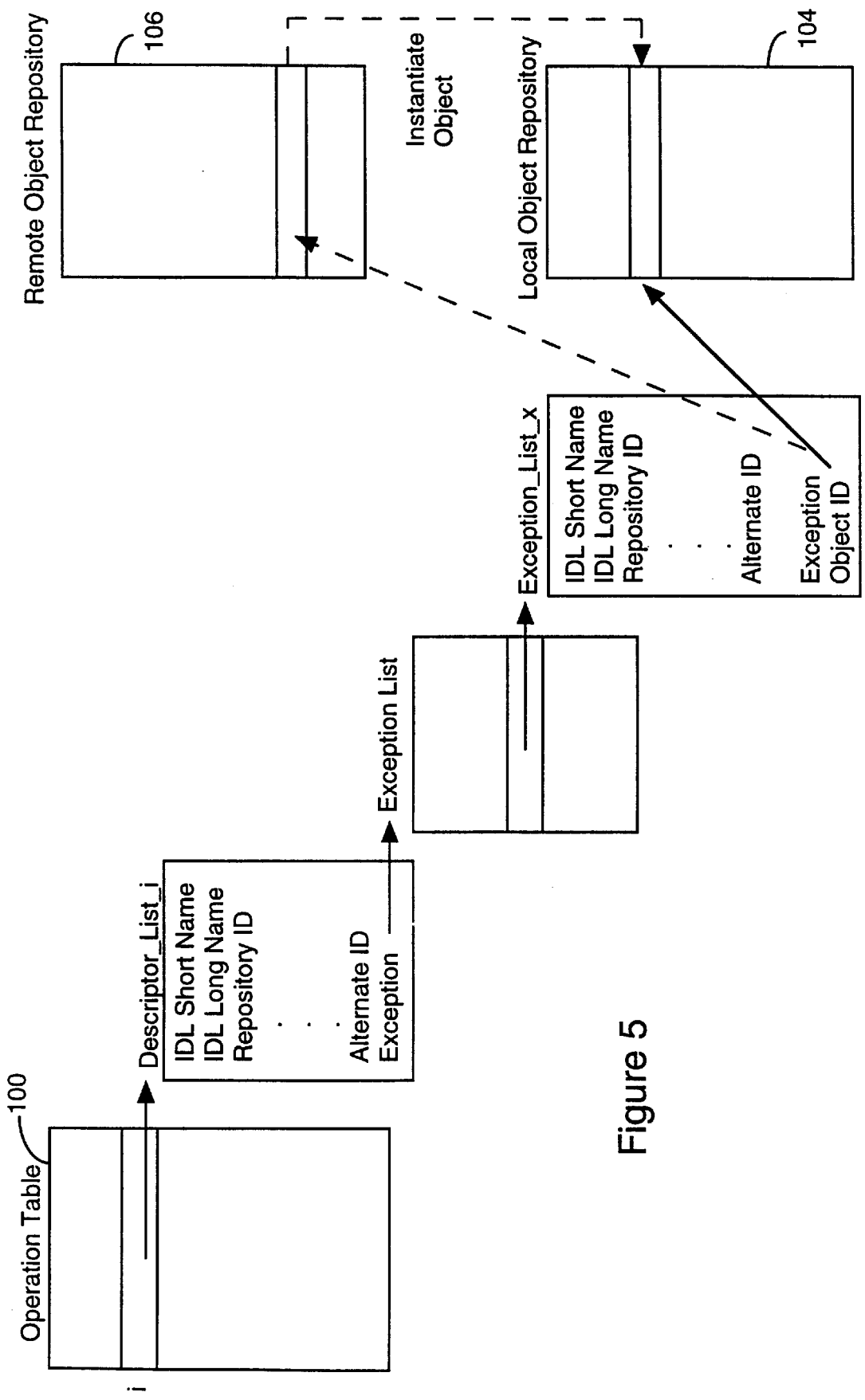
FIG. 5 is a generalized representation of a data structure that may be used in practicing the disclosed technology.

FIG. 5 illustrates that the invention supports the exceptions associated with method calls. In prior art systems of the type discussed above, exception code associated with a method is loaded before the method is invoked. For example, when a method is invoked in a prior art system, the client computer 22A loads the code for all exceptions associated with the method call before generating an RPC to execute the method.

More specifically, for each possible exception condition, there is a corresponding object class. When an exception's object class is instantiated, an object instance is created that includes a method (i.e., an executable program) for responding to or otherwise processing the corresponding exception. Thus, in the prior art system, when a client application program initiates an RPC to invoke an object method, if the RPC references a long list of exception object classes, all those exception object classes will need to be instantiated in the address space of the client application program 34 before the RPC in the client subcontract 40 can even transmit the method call to the server computer 24.

While the exception information for some of these exceptions (i.e., instances of some of the exception object classes) may be available on the client computer 22, in most cases at least some of the exception object classes will not be resident on the client computer 22. For those exceptions that do not have corresponding exception procedures (i.e., exception code) on the client computer 22, the client computer 22 is forced to retrieve the exception procedures from remote computers, such as server 24N, shown in FIG. 1. Furthermore, a separate communication session is typically required to obtain each exception procedure (i.e., exception code). Consequently, the process of gathering exception code can be relatively time consuming. This processing penalty is especially unfortunate since in most cases the exception code is not required by the client computer 22.

A method call in the present invention does not reference each exception associated with the method call. Consequently, the different exceptions are not loaded initially. They are only loaded if an exception is delivered. Thus, with the present invention, only the method call is processed initially, resulting in faster performance. The improved performance is only unavailable in the relatively rare event that an exception is processed.

As shown in FIG. 5, each identified method, say the method associated with Descriptor_List_i, has an associated exception descriptor. The exception descriptor is a pointer. For example, relying upon the "get_weak_ comparator" example above, the exception descriptor is _get_weak_comparatorExceptionDescriptorInstance.

The exception descriptor points to an exception list that has M exception subset lists. FIG. 5 shows Exception_ List_x. Each subset list specifies one of the exceptions to the method call including the IDL short name, IDL long name, a repository identification, and any alternate identification for the exception. Each exception list also includes an exception object identifier, which is used to locate exception code at run time.

The exception descriptor concept used in this embodiment of the invention is shown in FIG. 4. Note that the last entry in the subset descriptor list "Descriptor_List_1 "is an exception descriptor that points to an exception list. The reply generated by the server computer when executing a method may include any one of the entries within the Exception list, say, the exceptions associated with Exception$_{13}$ List_1, Exception_List_3, or Exception_List_M. A specified server subcontract 58 uses its associated protocol to transmit the exceptions. The client computer 22 then receives the exceptions from the server computer 24.

In accordance with the present invention, the client subcontract 40 stores a copy of the exception list associated with an exception descriptor. Thus, when the exceptions are received from the server computer 24, the client computer 22 can match them to the exceptions in the exception list, using the technique previously disclosed in relation to identifying methods.

The exception is then processed by relying upon an exception object identifier, which is used to retrieve the exception code associated with the exception. Note in FIG. 5 that Exception$_{13}$List_x, like all other exception subset lists, includes an exception object identifier (Exception Object ID), which is a string name that specifies the object class to handle the exception. The code for the object class may be in a local object repository 104. In the event that the object does not reside in the local object repository 104, the operating system 42 instantiates the object into the local object repository 104 by downloading code from another computer on the network, say server 24N of FIG. 1. Thus, the remote object repository 106 of FIG. 5 refers generally to any computer that is called to provide code for an object. The code is then directed into the local object repository 104. The process of fetching code from the local object repository 104 and the remote object repository 106 is similar to prior art approaches, but the operation in the present invention is executed after an exception has been returned, instead of when the method descriptors are constructed.

Figure 6:
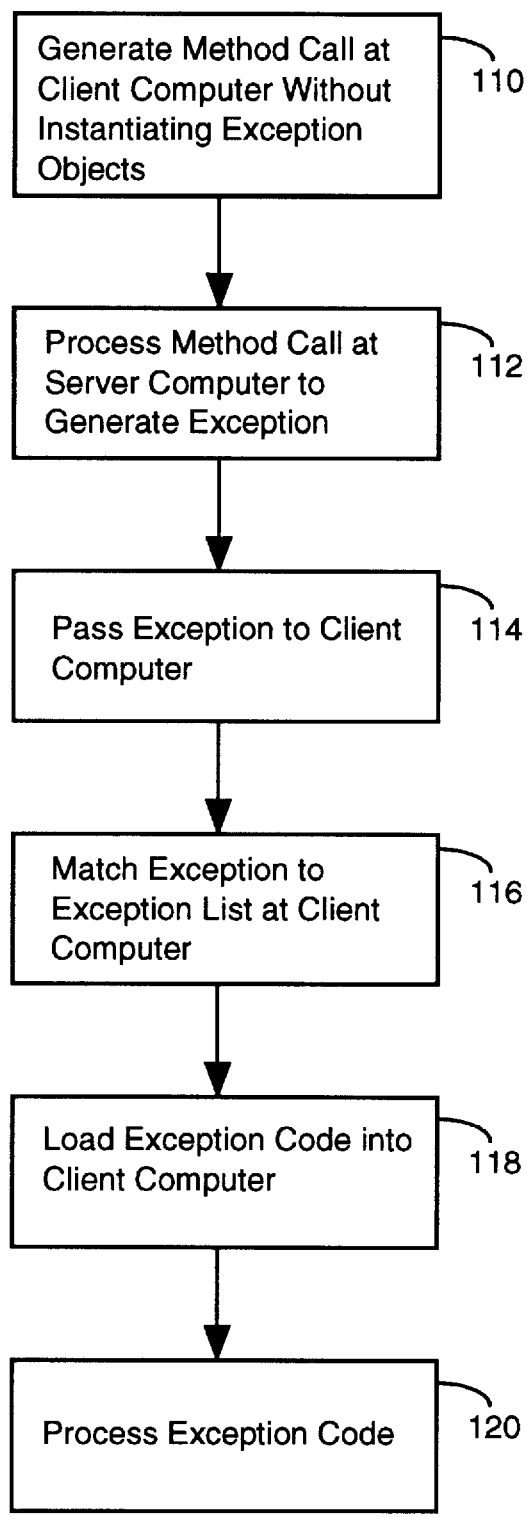
FIG. 6 illustrates processing steps associated with the dynamic loading of exception code, in accordance with one embodiment of the invention.

The foregoing disclosure of the invention is summarized in reference to FIG. 6. The first step associated with the process of FIG. 6 is to generate a method call at a client computer 22 (block 110). As indicated above, the method call of the invention does not instantiate an exception's object class. Thus, the method call is handled without instantiating exception objects.

The next processing step is to process the method call at the server computer 24 (block 112). As indicated above, the attempt to process the method call results in the server computer 24 identifying an exception. The exception is then passed to the client computer 22 (block 114).

When the client computer 22 receives the exception, it attempts to match it to the exceptions in the exception list that it stores (block 116). Each subset of the exception list (say, Exception_List_M) is associated with a single exception, and each subset has a corresponding exception object identifier (Exception_Object_ID, as shown in FIG. 4). The exception object identifier is used to load exception code into the client computer (block 118). Finally, the client computer processes the exception code to respond to the exception generated by the method call (block 120).

In view of the foregoing, the benefits of the present invention are manifest. In accordance with the invention, client computers 22 operate much faster because they load less information when a method is invoked. Specifically, they only load the code needed to process the method call. In the relatively unusual event that the method call is unsuccessful, then the exception code associated with the method is expeditiously loaded.

The foregoing descriptions of specific embodiments of the present invention are presented for purposes of illustration and description. They are not intended to be exhaustive or to limit the invention to the precise forms disclosed, obviously many modifications and variations are possible in view of the above teachings. For example, the techniques of the invention may be applied to any situation where call back objects are needed.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A method for handling method calls in a client/server computer system said method comprising the steps of:

receiving at a server computer a method call generated by a client computer;

attempting to execute said method call on said server computer;

generating at said server computer an exception to said method call in response to said attempting step;

passing said exception to said client computer;

matching at said client computer said exception to exceptions in an exception list to obtain an exception object identifier, wherein said matching step includes the step of using an exception list with a plurality of subset lists, each of said subset list corresponding to a specified exception and including a set of entries corresponding to different protocol-dependent statements used to characterize said specified exception;

loading into said client computer exception code corresponding to said exception object identifier; and processing said exception code to respond to said exception of said method call.

2. The method of claim 1 wherein said loading step includes the step of loading said exception code from a computer other than said client computer when said exception code is not resident on said client computer.

3. The method of claim 1 further comprising the steps of:
locating within said method call a method descriptor specified in a protocol-dependent format;
assigning an index value upon matching said method descriptor to a selected protocol-dependent statement in a list of protocol-dependent statement;
passing said index value to a protocol-independent processing module of said server computer, wherein said computer server returns to said client computer a reply based upon said index value.

4. A computer readable memory used to direct a client/server system to function in a specified manner, comprising:
method exception information stored in said memory, said method exception information including an exception list specifying a set of exceptions; and
executable instructions stored in said memory said executable instructions including:
instructions to generate at a server computer of a client/server system an exception in response to a method call from a client computer of said client/server system;
instructions to pass said exception from said server computer to said client computer;
instructions to match said exception to exceptions in said exception list to form an exception object identifier, wherein said instructions to match said exception to exceptions in said list include instructions to use an exception list with a plurality of subset lists, each of said subset lists corresponding to a specified exception and including a set of entries corresponding to different protocol-dependent statements used to characterize said specified exception;
instructions to load into said client computer exception code corresponding to said exception object identifier; and
instructions to process said exception code to respond to said exception of said method call.

5. The computer readable memory of claim 4 wherein said instructions to load into said client computer exception code corresponding to said exception object identifier includes instructions to load said exception code from a computer other than said client computer when said exception code is not resident on said client computer.

6. The computer readable memory of claim 4 further comprising:
instructions to locate within said method call a method descriptor specified in a protocol-dependent format;
instructions to assign an index value upon matching said method descriptor to a selected protocol-dependent statement in a list of protocol-dependent statements; and
instructions to pass said index value to a protocol-independent processing module of said server computer, wherein said computer server returns to said client computer a reply based upon said index value.

7. A method executed by a client/server computer system operating under the control of a program, said client/server computer system including a client computer memory and a server computer memory for storing said program, said method comprising the steps of:
storing an exception list in said client computer memory;
receiving at a server computer of said client/server computer system a method call generated by a client computer of said client/server computer system;
attempting to execute said method call on said server computer;
generating an exception to said method call in response to said attempting step;
passing said exception to said client computer;
matching said exception to exceptions in said exception list to obtain an exception object identifier, wherein said matching step includes the step of using an exception list with a plurality of subset lists, each of said subset lists corresponding to a specified exception and including a set of entries corresponding to different protocol-dependent statements used to characterize said specified exception;
loading into said client computer exception code corresponding to said exception object identifier; and
processing said exception code to respond to said exception of said method call.

8. The method of claim 7 wherein said matching step includes the step of using an exception list with an exception object identifier corresponding to each of said subset lists.

9. The method of claim 7 wherein said loading step includes the step of loading said exception code from a computer other than said client computer when said exception code is not resident on said client computer.

10. The method of claim 7 further comprising the steps of:
locating within said method call a method descriptor specified in a protocol-dependent format;
assigning an index value upon matching said method descriptor to a selected protocol-dependent statement in a list of protocol-dependent statement; and
passing said index value to a protocol-independent processing module of said server computer, wherein said computer server returns to said client computer a reply based upon said index value.

11. A client/server computer apparatus, comprising;
a transmission channel;
a client computer connected to said transmission channel, said client computer generating a method call without instantiating exception objects said being applied to said transmission channel; and
a server computer connected to said transmission channel, said server computer receiving said method call and generating an exception, said exception being applied to said transmission channel;
wherein said client computer processes said exception to
match said exception to an exception in an exception list to obtain an exception object identifier, wherein said client computer stores said exception list with a plurality of subset lists, each of said subset lists corresponding to a specified exception and including a set of entries corresponding to different protocol-dependent statements used to characterize said specified exception;
load exception code corresponding to said exception object identifier, and
process said exception code to respond to said exception.

12. The client/server computer apparatus of claim 11 wherein said client computer loads said exception code from a computer other than said client computer when said exception code is not resident on said client computer.

* * * * *

UNITED STATES PATENT AND TRADEMARK OFFICE
CERTIFICATE OF CORRECTION

PATENT NO. : 5,815,708

DATED : September 29, 1998

INVENTOR(S) : KESSLER et al.

It is certified that error appears in the above-identified patent and that said Letters Patent is hereby corrected as shown below:

Column 8, line 58, change "list" to --lists--;
Column 9, line 19, after "memory", insert --,--;
Column 10, line 33, change "statement" to --statements--;
Column 10, line 43, after "objects", insert --,--; and
Column 10, line 43, after "said", insert --method call--

Signed and Sealed this

Twenty-sixth Day of October, 1999

Attest:

Q. TODD DICKINSON

*Attesting Officer*   *Acting Commissioner of Patents and Trademarks*